May 16, 1933. P. R. ANDERSON 1,909,796
GOGGLES
Filed July 25, 1929
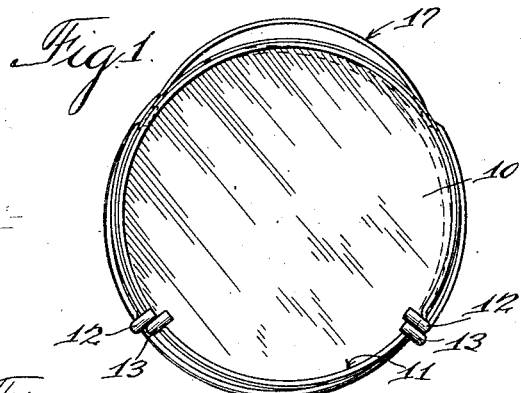
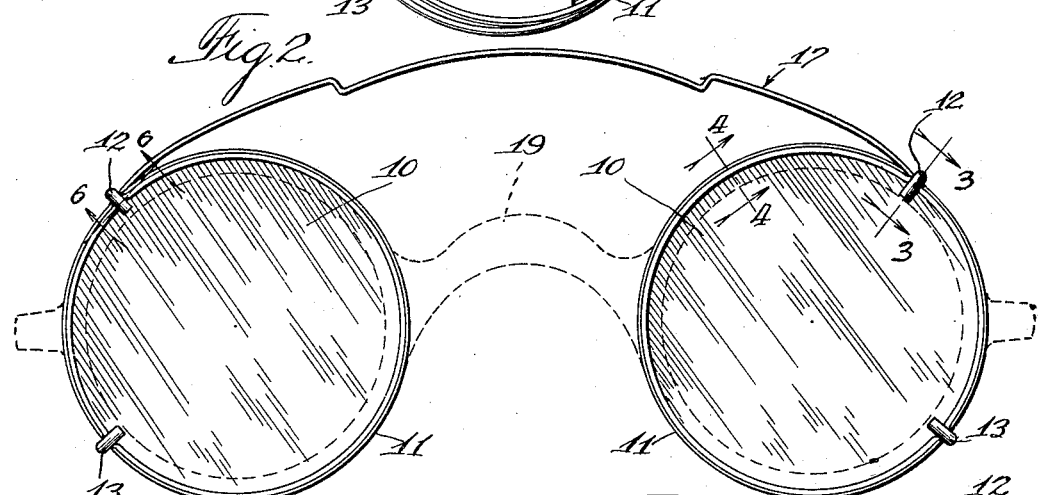
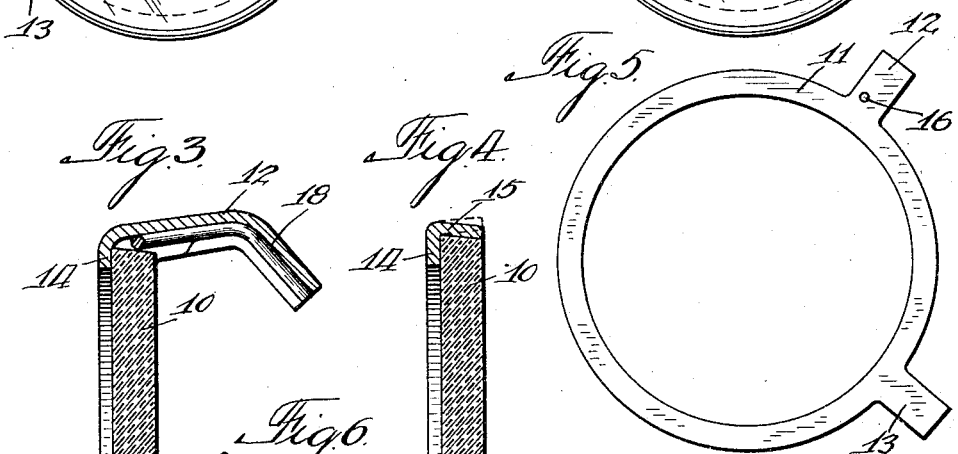
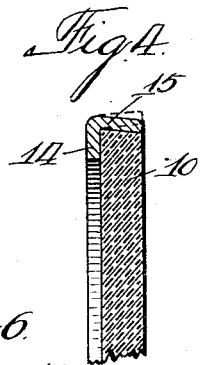
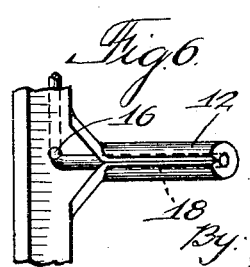
Inventor:
PHILIP R. ANDERSON
By Jones, Addington, Ames & Seibold
Attys.
Witness:
David S. Magnussen Patented May 16, 1933

1,909,796

UNITED STATES PATENT OFFICE

PHILIP R. ANDERSON, OF MILLER, INDIANA, ASSIGNOR TO SELLSTROM MANUFACTURING COMPANY, OF CHICAGO, ILLINOIS, A CORPORATION OF ILLINOIS

GOGGLES

Application filed July 25, 1929. Serial No. 380,924.

This invention relates to goggles and has special reference to those goggles attachable to eye-glasses for relief from the glare of the sun, snow or bright lights of any description. More particularly, this invention has reference to a device for use by those who wear eye-glasses comprising a pair of colored lenses made of crystal clear glass set in aluminum rims, the rims being bridged by a spring wire which urges the rims into a secure relation with the eye-glasses to which the goggles are attached.

The glare of lights, either natural or artificial has been of great hindrance to the many who are forced to wear eye-glasses since either they must discard their glasses and endure the blinding glare or else otherwise impair their eyesight by wearing the ordinary goggles provided with colored lenses not specially ground nor fitted. Of course, it is understood that persons may be fitted with eye-glasses which are of themselves colored. However, the present invention contemplates the provision of inexpensive means for attachment with the ordinary fitted eye-glasses to obtain the desired results without the attendant expense of specially ground and fitted colored lenses.

One of the objects of this invention is to provide a device as indicated above which is simple to attach, is attractive in appearance, is inexpensive to manufacture, and is durable.

Another object of this invention is to provide a device as characterized above which is extremely light in weight and may be collapsed into a compact state when not in use.

A further object of this invention is to provide a device as above noted which will fit all sizes and shapes of eye-glasses.

A still further object of this invention is to provide a device as hereinbefore mentioned wherein the frame thereof is hidden by the frame of the eye-glasses and is out of the line of vision.

Further objects and advantages will hereinafter be more particularly pointed out and for a more complete understanding of the nature, scope and characteristics of this invention reference may now be had to the accompanying description and the following drawing, in which latter:

Figure 1 is a front elevational view of the glasses as collapsed and ready to be placed in a container;

Fig. 2 is a front elevational view of the device of this invention as extended to fit a pair of eye-glasses;

Fig. 3 is an enlarged fragmentary sectional view taken on the line 3—3 of Fig. 2;

Fig. 4 is an enlarged fragmentary sectional view taken on the line 4—4 of Fig. 2;

Fig. 5 is a development of the frame member for holding the colored lenses; and

Fig. 6 is a fragmentary elevational view taken on the line 6—6 of Fig. 2 showing the lenses removed.

Referring now more particularly to the drawing the device of this invention comprises a pair of lenses made of crystal clear glass carefully smoked or colored in amber, amethyst or the like, to suit the needs of different eyes. The lenses are set in aluminum rims 11, which latter as shown more particularly in Fig. 5 of the drawing, is stamped from a single piece of thin sheet material, preferably aluminum, into any desired shape, the shape in this particular instance being round, although the various odd shapes now given glasses may be accommodated quite readily by the goggles of circular contour. A pair of projecting portions 12 and 13, preferably formed integrally with the circular rim portions 11, extend preferably radially therefrom. The blank of Fig. 5 is formed into an L-shaped cross-section as indicated in the dotted line showing of Fig. 4 in order to provide a flanged portion 14 for engaging adjacent the periphery of the lens on the face side thereof and an edge portion 15 for engaging the peripheral edge of the lens 10.

The lens 10 is preferably provided with a peripheral edge disposed at an angle to either face surface thereof, that is, the lens, when viewed in cross section, has converging outer edges. When the lens 10 is inserted into the L-shaped rim the edge portion 15 thereof is urged against the peripheral edge of the rim by means of any of numerous wellknown die constructions thereby to hold the rim and the lens in an assembled relation.

It will be noted that an aperture 16 is provided in the projecting portion 12 of each of the rims. These apertures are for receiving the end portions of a spring wire bridge 17, the latter urging the rims into a secure relation with the eye-glasses which action will hereinafter be more fully described.

Referring now more particularly to Figs. 3 and 6 of the drawing the end portion 18 of the spring wire bridge 17 is inserted through the aperture 16 from the outside side of the rim and extends at a right angle (see Fig. 6) to the main body portion of this spring wire bridge and along the projecting portion 12 of the rim 11. The material of the projecting portion 12 is wrapped around the end portion 18 to hold the same in a fixed position relative thereto. The end portion 12 thus is formed into a ring-like cross section, the outer edges thereof abutting. This same securing means is appropriated to each end of the spring wire bridge 17 whereby both of the rims 11 are held in a secure relation with each other.

The projecting portions 13 of the rim 11 are also formed into a member having a ring-like cross section, this construction being, of course, must stronger than were the projecting portion 13 permitted to remain in its initial state. All of the projecting portions 12 and 13, after they have been formed into their final shape of an annular cross section, are thereafter bent substantially centrally thereof, inwardly and at an angle into a substantially inverted V-shape or hook-shape in order to grip lenses of varying widths. It is obvious that the angularly disposed end portion of either of the projections 12 or 13 will adapt itself to fit any width onto which it may be attached.

A pair of eye-glasses 19 are shown in dotted lines in Fig. 2 of the drawing. The goggles of this invention are shown as mounted thereon, the rim portions including the lenses therein being hooked over the frame of the eye-glasses and held in position by means of the tension supplied by the spring wire bridge 17. When the goggles are released from the eye-glasses the spring wire bridge 17 urges the same into a collapsed position such as is shown in Figure 1. Applicant has found that the preferable form of bridge for use in this connection is that formed by a spring wire of circular cross-section although it is apparent that a spring wire of any cross-section may be employed.

It will be noted that the spring wire bridge 17 is formed of a central portion with contiguous offset end portions. It has been found in practice that such a construction will exert the necessary tension to hold the goggles in position on the eye-glasses and yet have such a desired flexibility as to be easy to handle with a minimum liability to fracture. When in a collapsed condition, it is seen from Figure 1 of the drawing that the bridge assumes a substantially circular shape. When the lenses are extended to fit the eye-glasses, the bridge approaches, in shape, closely to a straight line. With an ordinary wire, this flexibility is quite impossible without fracturing or breaking down the metal since an attempt to flex a wire of short length from a substantially circular shape to approximately a straight line would not tend to carry a uniform distribution of the flexure throughout the length but would tend to bend the wire at a point between the ends.

In the present construction, a substantially uniform flexure is carried throughout the length of the bridge although the greatest amount thereof is noted at the points of offset. There is no tendency to fracture nor to break down the fibres of the metal of the bridge and the resultant ease in the handling of the goggles, when used in connection with eye-glasses, is pronounced, this benefit being derived directly from the flexibility of the bridge.

While but a single embodiment of this invention is herein shown and described, it is to be understood that various modifications thereof will become apparent to those skilled in the art without departing from the spirit and scope of this invention and, therefore, the same is to be limited only by the scope of the prior art and the appended claims.

I claim:

1. In a device of the character described, a pair of rims formed of sheet material for holding lenses therein, projections formed integrally with said rims for engaging a pair of eye-glasses, and a spring wire connected between said projections for urging a secure relation between said lenses and said eye-glasses.

2. In a device of the character described, a pair of rims formed of sheet metal into a substantially L-shaped cross-section for directly engaging and holding lenses therein, and resilient means connecting said rims and held between said rims and said lenses for urging said lenses in a secure relation with a pair of eye-glasses.

3. In a device of the character described, a pair of rims formed of sheet metal, a lens having converging edges when viewed in cross-section for each of said rims, said rims gripping said converging edges, and means connecting said rims and held between said rims and said converging edges for urging said rims in a secure engagement with a pair of eye-glasses.

4. In a device of the character described, a pair of rims formed of sheet material into contiguous flange and collar portions, a lens having converging edges when viewed in cross-section for each of said rims, the flange and the collar of said rim engaging respectively the face side and the converging edge of said lens, and means for connecting and for urging said rims in a secure engagement with a pair of eye-glasses.

5. In a device of the character described, a pair of rims for holding lenses therein, extensions on said rims for engaging a pair of eye-glasses, resilient means connecting said rims for urging a secure relation between said rims and said eye-glasses, some of said extensions being permanently secured to the ends of said resilient means.

6. In a device of the character described, a pair of rims for holding lenses therein, extensions on said rims for engaging a pair of eye-glasses, a spring wire secured to one of said extensions on each of said rims for urging a secure relation between said projections and said glasses and for connecting said lenses.

7. In a device of the character described, a pair of rims for holding lenses therein formed of sheet metal, projections formed integrally with said rims, and a spring wire for connecting said rims, one of said projections on each rim being formed about said wire in a fixed relation therewith for gripping a pair of eye-glasses, said wire urging a secure relation therebetween.

8. In a device of the character described, a pair of rims for holding lenses therein formed of sheet metal, projections formed integrally with said rims, and a spring wire having a central portion and offset end portions for connecting said rims, some of said projections being formed about said wire in a fixed relation therewith for gripping a pair of eye-glasses, said wire urging a secure relation therebetween.

9. In a device of the character described, a pair of rims for holding lenses therein formed of sheet metal, projections formed integrally with said rims, and a spring wire for connecting said rims, one of said projections for each rim being formed about said wire in a fixed relation therewith, said wire and said projections being bent to provide a hook-shape for gripping the rims of a pair of eye-glasses.

In witness whereof, I have hereunto subscribed my name.

PHILIP R. ANDERSON.